(12) United States Patent
Ishijima et al.

(10) Patent No.: US 8,783,964 B2
(45) Date of Patent: Jul. 22, 2014

(54) BEARING DEVICE FOR DRIVING WHEEL

(71) Applicants: Minoru Ishijima, Shizuoka (JP);
Hiroshi Teduka, Shizuoka (JP);
Manabu Hoshino, Shizuoka (JP);
Kazuhiro Muramatsu, Shizuoka (JP)

(72) Inventors: Minoru Ishijima, Shizuoka (JP);
Hiroshi Teduka, Shizuoka (JP);
Manabu Hoshino, Shizuoka (JP);
Kazuhiro Muramatsu, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/050,685

(22) Filed: Oct. 10, 2013

(65) Prior Publication Data

US 2014/0035350 A1 Feb. 6, 2014

Related U.S. Application Data

(62) Division of application No. 12/922,584, filed as application No. PCT/JP2009/054637 on Mar. 11, 2009, now Pat. No. 8,591,118.

(30) Foreign Application Priority Data

Mar. 25, 2008 (JP) ................................ 2008-078994
Apr. 2, 2008 (JP) ................................ 2008-096437

(51) Int. Cl.
*F16C 13/00* (2006.01)
*B60B 27/00* (2006.01)
*F16C 19/38* (2006.01)
*F16C 35/04* (2006.01)
*F16D 1/108* (2006.01)
*F16D 3/223* (2011.01)
*B60B 7/06* (2006.01)

(52) U.S. Cl.
CPC ................ *F16D 1/108* (2013.01); *F16D 3/223* (2013.01); *F16D 2003/22326* (2013.01); *B60B 7/066* (2013.01); *B60B 27/0084* (2013.01)
USPC .......... 384/544; 384/589; 384/626; 301/110; 464/178

(58) Field of Classification Search
CPC ..... B60B 7/066; B60B 27/0084; F16D 1/108; F16D 3/223; F16D 2003/22326
USPC ......... 384/462, 490, 504, 544, 548, 586, 589, 384/626
See application file for complete search history.

(56) References Cited

U.S. PATENT DOCUMENTS 5,760,999 A * 6/1998 Yahata ........................ 360/98.01
6,135,571 A 10/2000 Mizukoshi et al.
(Continued)

FOREIGN PATENT DOCUMENTS

CN         1380150      11/2002
DE         100 09 216    8/2001
(Continued)

OTHER PUBLICATIONS

International Search Report issued Jun. 16, 2009 in International (PCT) Application No. PCT/JP2009/054637.
(Continued)

*Primary Examiner* — Marcus Charles
(74) *Attorney, Agent, or Firm* — Wenderoth, Lind & Ponack, L.L.P.

(57) ABSTRACT

A driving-wheel bearing device includes an outer race having double-row outer raceway surfaces formed on an inner periphery thereof, a hub wheel and an inner race having a wheel attachment flange at one end thereof and double-row inner raceway surfaces on an outer periphery thereof, and double-row rolling elements interposed between the outer raceway surfaces of the outer race and the inner raceway surfaces of the hub wheel and the inner race, the hub wheel having a shaft hole into which a stem section extending from an outer joint member of a constant velocity universal joint is spline-fitted by being press-fitted, in which a plate having a molybdenum coating layer or a fluorine-resin coating layer formed thereon and having a plate thickness ranging from 0.5 mm to 2 mm is interposed between opposite surfaces of a shoulder portion of the outer joint member and a crimped portion of the hub wheel.

5 Claims, 14 Drawing Sheets

(56) References Cited

U.S. PATENT DOCUMENTS

| | | | |
|---|---|---|---|
| 6,286,909 B1 * | 9/2001 | Mizukoshi et al. | 384/544 |
| 6,464,399 B1 * | 10/2002 | Novak et al. | 384/477 |
| 6,749,517 B2 * | 6/2004 | Ouchi | 384/544 |
| 8,038,353 B2 * | 10/2011 | Uchiyama | 384/544 |
| 8,591,118 B2 * | 11/2013 | Ishijima et al. | 384/544 |
| 2003/0059141 A1 * | 3/2003 | Vignotto et al. | 384/484 |
| 2003/0102058 A1 | 6/2003 | Ishikawa et al. | |
| 2003/0155803 A1 | 8/2003 | Kayama et al. | |
| 2006/0223643 A1 * | 10/2006 | Arrieta et al. | 464/145 |
| 2007/0098315 A1 * | 5/2007 | Komori et al. | 384/544 |
| 2007/0230850 A1 * | 10/2007 | Seo | 384/544 |

FOREIGN PATENT DOCUMENTS

| | | |
|---|---|---|
| EP | 0 936 086 | 8/1999 |
| JP | 2001-347805 | 12/2001 |
| JP | 2003-083384 | 3/2003 |
| JP | 2003-097588 | 4/2003 |
| JP | 2004-256106 | 9/2004 |
| JP | 2005-145315 | 6/2005 |
| JP | 2006-188187 | 7/2006 |
| JP | 2006-234152 | 9/2006 |
| JP | 2006-275174 | 10/2006 |
| JP | 2007-076465 | 3/2007 |
| JP | 2007-508986 | 4/2007 |
| JP | 2007-269119 | 10/2007 |
| JP | 2007-276764 | 10/2007 |
| JP | 2007-292203 | 11/2007 |
| JP | 2007-298092 | 11/2007 |
| JP | 2008-155692 | 7/2008 |
| JP | 2008155692 A * | 7/2008 |
| JP | 2008-221982 | 9/2008 |
| JP | 2008221982 A * | 9/2008 |
| JP | 2008-296841 | 12/2008 |
| WO | 2005/050044 | 6/2005 |

OTHER PUBLICATIONS

International Preliminary Report on Patentability and Written Opinion of the International Searching Authority mailed Nov. 18, 2010 in International (PCT) Application No. PCT/JP2009/054637.

Chinese Office Action issued Dec. 3, 2012 in corresponding Chinese Patent Application No. 200980110558.2 with English translation.

Japanese Office Action issued Jan. 7, 2013 in corresponding Japanese Patent Application No. 2008-096437 with partial English translation.

Japanese Notification of Interrogation dated Aug. 29, 2013 in corresponding Japanese Patent Application No. 2008-78994 with partial English translation.

Supplementary European Search Report issued Mar. 15, 2011 in corresponding European Patent Application No. 09725468.4.

* cited by examiner

Fig. 8A
Fig. 8B
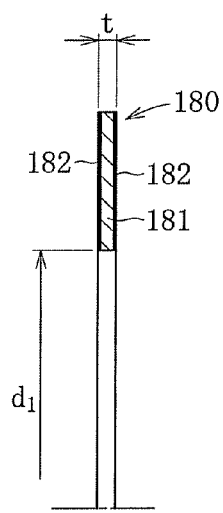
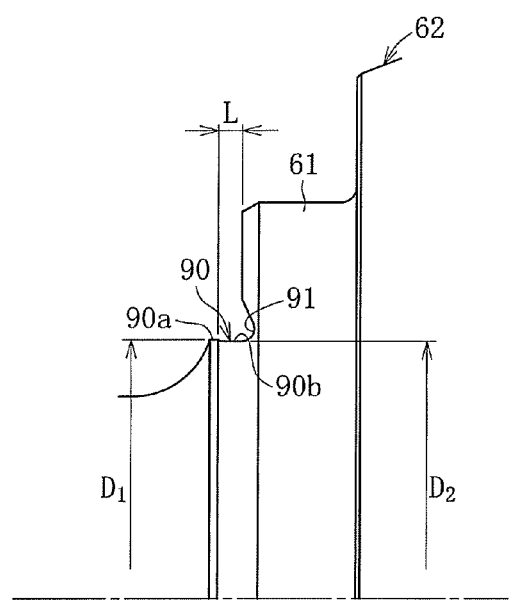

BEARING DEVICE FOR DRIVING WHEEL

CROSS REFERENCE TO RELATED APPLICATION

The present application is a divisional application of U.S. application Ser. No. 12/922,584, now U.S. Pat. No. 8,591,118, which is a U.S. National Stage Application of International SPCT) Application No. PCT/JP2009/054637, filed Mar. 11, 2009.

BACKGROUND OF THE INVENTION

I. Technical Field

The present invention relates to a driving-wheel bearing device which rotatably supports a driving wheel (front wheel of a front-engine front-drive (FF) vehicle, rear wheel of a front-engine rear-drive (FR) vehicle, and all wheels of a four-wheel drive (4WD) vehicle) with respect to a suspension device for, for example, an automobile.

II. Description of the Related Art

Bearing devices for automobiles include ones for driving wheels and ones for driven wheels, and there have been proposed ones of various types in accordance with respective applications. For example, FIG. 16 illustrates a driving-wheel bearing device. The bearing device includes the following as main components: a hub wheel 210 and an inner race 220, double-row rolling elements 230 and 240, an outer race 250, and a constant velocity universal joint 260.

The hub wheel 210 has an outboard-side inner raceway surface 212 formed on an outer peripheral surface thereof, and includes a wheel attachment flange 214 for allowing a wheel (not shown) to be attached thereto. Hub bolts 216 for fixing a wheel disk are equiangularly embedded in the wheel attachment flange 214. The inner race 220 is fitted to a small-diameter step portion 218 formed on the outer peripheral surface of the hub wheel 210, and an inboard-side inner raceway surface 222 is formed on an outer peripheral surface of the inner race 220. A female spline 211 for coupling the constant velocity universal joint 260 with the hub wheel 210 so that torque can be transmitted therebetween is formed on an inner peripheral surface of a shaft hole of the hub wheel 210.

The inner race 220 is press-fitted to the small-diameter step portion 218 of the hub wheel 210 with adequate tightening margin for the purpose of preventing creep. The outboard-side inner raceway surface 212 formed on the outer peripheral surface of the hub wheel 210 and the inboard-side inner raceway surface 222 formed on the outer peripheral surface of the inner race 220 constitute double-row inner raceway surfaces. The inner race 220 is press-fitted to the small-diameter step portion 218 of the hub wheel 210, and the end portion of the small-diameter step portion 218 of the hub wheel 210 is crimped outward. As a result, the inner race 220 is prevented from slipping off by a crimped portion 213 thus formed, and is integrated with the hub wheel 210, to thereby apply preload to a bearing section 270.

The outer race 250 has double-row outer raceway surfaces 252 and 254 formed on an inner peripheral surface thereof and opposed to the inner raceway surfaces 212 and 222 of the hub wheel 210 and the inner race 220, and includes a vehicle body attachment flange 256 for being attached to a vehicle body (not shown). The vehicle body attachment flange 256 is fixed, with use of an attachment hole 258, by bolts or the like to a knuckle extending from a suspension device (not shown) of a vehicle body.

The bearing section 270 has a double-row angular ball bearing structure, specifically, has the following structure: the rolling elements 230 and 240 are interposed between the inner raceway surfaces 212 and 222 formed on the outer peripheral surfaces of the hub wheel 210 and inner race 220 and the outer raceway surfaces 252 and 254 formed on the inner peripheral surface of the outer race 250; the rolling elements 230 and 240 in respective rows are rotatably and equiangularly retained by retainers 232 and 242.

At the openings on both ends of the bearing section 270, a pair of seals 234 and 244 for sealing annular spaces between the outer race 250 and the hub wheel 210 and between the outer race 250 and the inner race 220 so as to be held in sliding-contact with the outer peripheral surfaces of the hub wheel 210 and inner race 220 are fitted to the inner periphery at both end portions of the outer race 250. Further, the seals 234 and 244 prevent leakage of lubricant filling the inside and intrusion of water and foreign matters from the outside.

An outer joint member 262 of the constant velocity universal joint 260 is coupled with the hub wheel 210, and hence a bearing device is constituted. The outer joint member 262 of the constant velocity universal joint 260 is provided at one end of an intermediate shaft (not shown) constituting a drive shaft, and is constituted by the following: a cup-shaped mouth section 264 housing inner components (not shown) including an inner joint member, balls, and a cage; and a stem section 266 extending integrally from a proximal portion of the mouth section 264 in an axial direction. A male spline 268 for coupling the hub wheel 210 with the constant velocity universal joint 260 so that torque can be transmitted therebetween is formed on an outer peripheral surface of the stem section 266.

The stem section 266 of the outer joint member 262 is press-fitted to the shaft hole of the hub wheel 210, and the male spline 268 formed on the outer peripheral surface of the stem section 266 and the female spline 211 formed on the inner peripheral surface of the shaft hole of the hub wheel 210 are fitted to each other. In this manner, torque can be transmitted. Further, in a state in which opposite surfaces of the crimped portion 213 of the hub wheel 210 and a shoulder portion 261 of the outer joint member 262 are hit against each other, a nut 272 is tightened to a male-screw portion 265 formed at an end portion of the stem section 266. In this manner, the constant velocity universal joint 260 is fixed to the hub wheel 210.

Incidentally, in the driving-wheel bearing device, the crimped portion 213 of the hub wheel 210 of the bearing section 270 and the shoulder portion 261 of the outer joint member 262 are in a contact state of being hit against each other. Thus, upon starting of a vehicle, there is a risk that stick-slip noise commonly known as squeaking noise is generated between the crimped portion 213 of the hub wheel 210 of the bearing section 270 and the shoulder portion 261 of the outer joint member 262.

The stick-slip noise means noise generated by abrupt sliding caused as follows: upon starting of a vehicle, although rotational torque is applied from the outer joint member 262 of the constant velocity universal joint 260 with respect to the hub wheel 210 of the bearing section 270 in a static state so as to be transmitted from the outer joint member 262 to the hub wheel 210 through intermediation of the female spline 211 and the male spline 268, the transmitted torque between the bearing section 270 and the outer joint member 262 varies and the outer joint member 262 twists, with the result that abrupt sliding occurs between the crimped portion 213 of the hub wheel 210 and the shoulder portion 261 of the outer joint member 262.

As means for preventing the stick-slip noise, there has been provided means for sandwiching a plate excellent in sliding properties between the opposite surfaces of an inboard-side end portion of the bearing section 270 and the shoulder portion 261 of the outer joint member 262 (refer to JP 2003-97588 A and JP 2007-508986 A).

In JP 2003-97588 A and JP 2007-508986 A mentioned above, the plate is interposed between the opposite surfaces of the inboard-side end portion of the bearing section 270 and the shoulder portion 261 of the outer joint member 262. As a result, frictional resistance is reduced between the opposite surfaces of the inboard-side end portion of the bearing section 270 and the shoulder portion 261 of the outer joint member 262 so that positive sliding is caused. Thus, abrupt sliding is not caused, and hence generation of stick-slip noise is prevented.

SUMMARY OF INVENTION

Incidentally, the bearing devices disclosed in JP 2003-97588 A and JP 2007-508986 A, as described above, an annular plate excellent in sliding properties is interposed between the opposite surfaces of the inboard-side end portion of the bearing section 270 and the shoulder portion 261 of the outer joint member 262. In this manner, generation of stick-slip noise is prevented.

However, in those bearing devices, the constant velocity universal joint 260 is fixed to the hub wheel 210 by an axial force exerted by tightening of the nut 272 to the male-screw portion 265 formed at the end portion of the stem section 266. Thus, owing to deformation and the like of the plate with high surface pressure applied to the plate by the axial force, there is a risk that the axial force is reduced. When the axial force is reduced in this way, a gap is formed between the opposite surfaces of the inboard-side end portion of the bearing section 270 and the shoulder portion 261 of the outer joint member 262. In this context, when corrosion-resistance properties of the plate itself are low, anti stick-slip properties of the plate is impaired owing to corrosion. As a result, the thickness of the plate is reduced owing to the corrosion, which may lead to a risk of further reduction of the axial force. In particular, in a case of a type that the inboard-side end portion of the bearing section is not crimped outward (type that the inner race of the bearing section and the shoulder portion of the constant velocity universal joint are held in direct contact with each other), there occurs a failure of impairing durability of the bearing section.

Further, the surface roughness of the plate prior to coating is not disclosed at all in JP 2003-97588 A and JP 2007-508986 A described above. Thus, the applicants of the present invention have focused attention on the surface roughness of the plate prior to coating.

In other words, when the surface roughness of the plate prior to coating is excessively small, adhesion properties between the surface of the plate and a coating material are reduced. Thus, when rotational torque is input in a state in which the plate is interposed between the bearing section 270 and the shoulder portion 261 of the outer joint member 262, the coating material is caused to be peeled off early, and hence it has been difficult to sufficiently yield the functions of the coating material. In contrast, when the surface roughness prior to coating is excessively large, surface pressure of protruding portions becomes higher with the surface roughness, and hence problems such as early wearing of the coating material occur on that portions. Also in this case, it has been difficult to sufficiently yield the functions of the coating material.

It is therefore an object of the present invention to provide a driving-wheel bearing device preventing reduction of the axial force over a long period of time and being capable of securing anti stick-slip properties.

In order to achieve the above-mentioned object, according to the present invention, there is provided a driving-wheel bearing device including: an outer member having double-row outer raceway surfaces formed on an inner periphery thereof; an inner member constituted by a hub wheel and an inner race, the inner member having a wheel attachment flange at one end thereof and double-row inner raceway surfaces on an outer periphery thereof; and double-row rolling elements interposed between the double-row outer raceway surfaces of the outer member and the double-row inner raceway surfaces of the inner member, the hub wheel having a shaft hole into which a stem section extending from an outer joint member of a constant velocity universal joint is spline-fitted by being press-fitted, in which a plate having a molybdenum coating layer or a fluorine-resin coating layer formed thereon and having a plate thickness ranging from 0.5 mm to 2 mm is interposed between opposite surfaces of a shoulder portion of the outer joint member and an end portion of the inner member.

In the present invention, the plate endowed with excellent sliding properties due to formation of the molybdenum coating layer or the fluorine-resin coating layer is interposed between the opposite surfaces of the shoulder portion of the outer joint member and the end portion of the inner member. As a result, even when transmitted torque between the bearing section having the inner member and the outer joint member varies and the outer joint member twists, frictional resistance is reduced between the bearing section and the outer joint member so that positive sliding is caused. Thus, abrupt sliding is not caused between the bearing section and the outer joint member, and hence generation of stick-slip noise is prevented.

Further, when the thickness of the plate excellent in sliding properties is set to 0.5 mm or more, the strength of the plate is secured. High surface-pressure applied by the axial force to the plate prevents deformation or the like of the plate, and hence reduction of the axial force is prevented. Meanwhile, when the thickness of the plate is set to 2 mm or less, compact design can be secured without increase in axial dimension of the bearing device.

It is desirable that a film thickness of the molybdenum coating layer or the fluorine-resin coating layer of the present invention be set within a range from 2 μm to 30 μm. When the film thickness of the molybdenum coating layer or the fluorine-resin coating layer is set to 2 μm or more, the molybdenum coating layer or the fluorine-resin coating layer is not worn early. Further, when the film thickness of the molybdenum coating layer or the fluorine-resin coating layer is set to 30 μm or less, use amount of a coating material is minimized, and hence cost increase is not involved. In addition, crush of the coating layer is suppressed even when high surface-pressure is applied by the axial force to the plate, and hence reduction of the axial force is prevented, and hence durability of the bearing section can be secured.

It is desirable that the material of the plate of the present invention be stainless steel. With this configuration, the plate itself can be caused to yield corrosion-resistance effect, and hence generation of stain is prevented. As a result, it is capable of coping with use environment in which corrosion-resistance properties such as those of automobiles are required over a long period of time.

It is desirable that a yield strength of the plate of the present invention be set to 205 N/mm² or more. With this setting, deformation of the plate is prevented even when high surface-pressure is applied by the axial force to the plate, and hence reduction of the axial force is prevented.

It is desirable that the plate of the present invention be constituted by an annular portion interposed between the two opposite surfaces of the shoulder portion of the outer joint member and the end portion of the inner member and by a cylindrical portion formed of a peripheral edge of the annular portion, the peripheral edge being elongated in an axial direction and fitted to the shoulder portion of the outer joint member. With this structure, when the cylindrical portion of the plate is fitted to the shoulder portion of the outer joint member, the plate can be interposed in a state in which the annular portion is easily positioned between the two opposite surfaces of the end portion of the inner member and the shoulder portion of the outer joint member in a state in which the plate is assembled to the outer joint member.

Further, it is desirable that the plate of the present invention be constituted by an annular portion interposed between the two opposite surfaces of the shoulder portion of the outer joint member and the end portion of the inner member and by a cylindrical portion formed of a peripheral edge of the annular portion, the peripheral edge being elongated in the axial direction and fitted to the end portion of the inner member. With this structure, when the cylindrical portion of the plate is fitted to the end portion of the inner member, the plate can be interposed in a state in which the annular portion is easily positioned between the two opposite surfaces of the end portion of the inner member and the shoulder portion of the outer joint member in a state in which the plate is assembled to the inner member.

Further, a driving-wheel bearing device according to the present invention includes: an outer member having double-row outer raceway surfaces formed on an inner periphery thereof; an inner member constituted by a hub wheel and an inner race, the inner member having a wheel attachment flange at one end thereof and double-row inner raceway surfaces on an outer periphery thereof; and double-row rolling elements interposed between the double-row outer raceway surfaces of the outer member and the double-row inner raceway surfaces of the inner member, the hub wheel having a shaft hole into which a stem section extending from an outer joint member of a constant velocity universal joint is spline-fitted by being press-fitted, in which: a plate endowed with predetermined sliding properties by coating of at least one surface of a substrate is interposed between opposite surfaces of a shoulder portion of the outer joint member and an end portion of the inner member; and a surface roughness of the coating-object substrate is set to be Rz=0.2~15.0. Note that, Rz means one of surface parameters defined in JIS, specifically, ten-point average roughness.

In this context, the description "at least one surface of a substrate" encompasses the following cases: coating only the substrate surface opposite to the shoulder portion of the outer joint member; coating only the substrate surface opposite to the end portion of the inner member; and coating both the substrate surfaces.

In the present invention, the plate endowed with predetermined sliding properties due to coating of the surface of the substrate is interposed between the opposite surfaces of the shoulder portion of the outer joint member and the end portion of the inner member. As a result, even when transmitted torque between the bearing section having the inner member and the outer joint member varies and the outer joint member twists, frictional resistance is reduced between the bearing section and the outer joint member so that positive sliding is caused. Thus, abrupt sliding is not caused between the bearing section and the outer joint member, and hence generation of stick-slip noise is prevented.

By setting of the surface roughness of the coating-object substrate of the plate to be Rz=0.2~15.0, a coating material is more easily applied onto the surfaces of the substrate, and hence adhesion properties are enhanced. As a result, even when rotational torque is input, problems such as early peeling-off and early wearing of the coating material are prevented, and hence functions of the coating material is sufficiently yielded more easily.

In the present invention, it is desirable that a recess groove into which an inner periphery of the plate is fitted be formed on the shoulder portion of the outer joint member. When the recess groove into which the inner periphery of the plate is fitted is provided to the shoulder portion of the outer joint member, the plate can be easily assembled to the shoulder portion of the outer joint member, and easily positioned and interposed between the end portion of the inner wheel and the shoulder portion of the outer joint member in a state in which the plate is assembled to the outer joint member.

It should be noted that it is desirable that an escape portion be provided at an innermost part of the recess groove into which the plate is fitted. When the escape portion is provided as just described above, the fitting work is facilitated when the plate is fitted into the recess groove of the shoulder portion of the outer joint member.

In the present invention, it is desirable that claw-like protrusions be provided on the inner periphery of the plate. With this structure, mountability of the plate is enhanced. In other words, with provision of the claw-like protrusions, for example, at a plurality of points along the circumferential direction of the inner periphery of the plate, only the parts corresponding to the protrusions come into contact with the shoulder portion of the outer joint member in the circumferential direction of the inner periphery of the plate, and hence the plate is more easily mounted to the outer joint member.

It is desirable that the plate of the present invention be endowed with the predetermined sliding properties by being subjected to coating with a film containing at least one of a fluorine resin and molybdenum disulfide. In order to easily secure the predetermined sliding properties of the plate, it is only necessary that the plate be subjected to coating with the film containing at least one of a fluorine resin and molybdenum disulfide.

In this context, the description "the film containing at least one of a fluorine resin and molybdenum disulfide" encompasses the following cases: coating only with the film containing a fluorine resin; coating only with the film containing molybdenum disulfide; and coating with the film containing both a fluorine resin and molybdenum disulfide.

In the present invention, it is desirable that lubricant be interposed in at least one of a gap between the plate and the shoulder portion of the outer joint member and a gap between the plate and the end portion of the inner member. With this structure, the frictional resistance is further reduced between the bearing section and the outer joint member so that positive sliding easily occurs, with the result that generation of stick-slip noise is more reliably prevented.

In this context, the description "at least one of a gap between the plate and the shoulder portion of the outer joint member and a gap between the plate and the end portion of the inner member" encompasses the following cases: interposing lubricant only in the gap between the plate and the shoulder portion of the outer joint member; interposing lubricant only in the gap between the plate and the end portion of the inner member; and interposing lubricant in both the gaps.

Note that, the bearing device is applicable to a bearing device of the following type: the small-diameter step portion is formed on the outer peripheral surface of the hub wheel, the one-side inner raceway surface being formed on the outer peripheral surface; the inner race provided with the other-side inner raceway surface is press-fitted to the small-diameter step portion; and the end portion of the small-diameter step portion of the hub wheel is crimped. In this case, the crimped portion of the hub wheel is opposed to the shoulder portion of the outer joint member.

Further, other than the bearing device of the type described above, the bearing device is also applicable to a bearing device of the following type: the pair of inner races are fitted to the outer peripheral surface of the hub wheel; the outboard-side inner raceway surface is formed on the outer peripheral surface of the one-side inner race; and the inboard-side inner raceway surface is formed on the outer peripheral surface of the other-side inner race. In this case, an end portion of the other-side inner race positioned on the inboard-side is opposed to the shoulder portion of the outer joint member.

According to the present invention, upon starting of a vehicle, in a case where rotational torque is applied from the outer joint member of the constant velocity universal joint with respect to the hub wheel of the bearing section in a static state, even when the transmitted torque between the bearing section having the inner member and the outer joint member varies and the outer joint member twists, frictional resistance is reduced between the bearing section and the outer joint member so that positive sliding is caused. Thus, abrupt sliding is not caused between the bearing section and the outer joint member. As a result, generation of stick-slip noise is prevented, and hence it is possible to enhance quietness and to eliminate unpleasant feeling of drivers.

Further, when the thickness of the plate excellent in sliding properties is set to 0.5 mm to 2 mm, the following advantages can be obtained: the strength of the plate is secured; high surface-pressure applied by the axial force to the plate prevents deformation or the like of the plate, and hence reduction of the axial force is prevented over a long period of time; and anti stick-slip properties are secured. As a result, it is possible to provide a compact driving-wheel bearing device.

In addition, by setting of the surface roughness of the coating-object substrate to be Rz=0.2~15.0, a coating material is more easily applied onto the surfaces of the substrate, and hence adhesion properties are enhanced. As a result, even when rotational torque is input, problems such as early peeling-off and early wearing of the coating material are prevented, and hence functions of the coating material is sufficiently yielded more easily. Consequently, it is possible to provide a driving-wheel bearing device endowed with anti stick-slip properties secured over a long period of time.

BRIEF DESCRIPTION OF DRAWINGS

FIG. 8A is a partially enlarged sectional view of the plate of FIG. 7.

FIG. 8B is a partially enlarged front view of the shoulder portion of the outer joint member of FIG. 7.

DETAILED DESCRIPTION OF THE INVENTION

Figure 1:
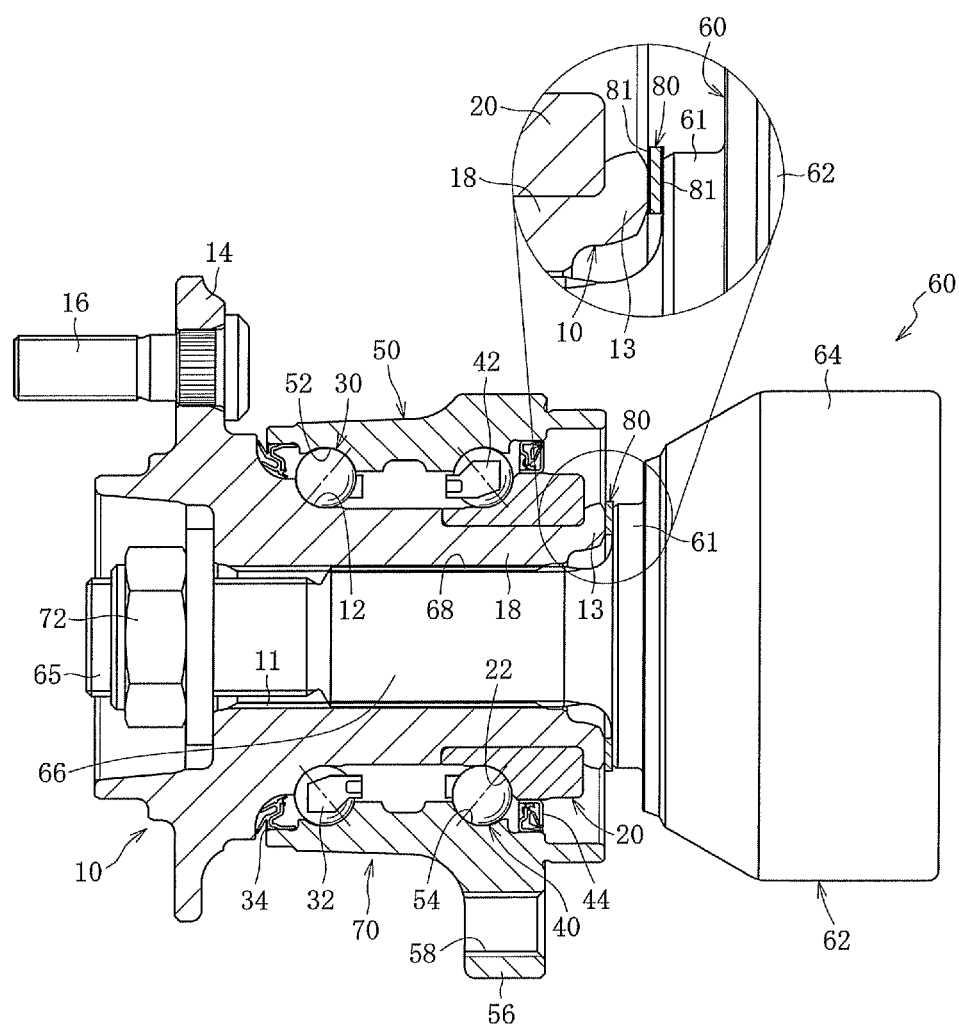
FIG. 1 is a vertical sectional view illustrating an application example of a first embodiment of the present invention, in which a plate is interposed between a crimped portion of a hub wheel and a shoulder portion of an outer joint member.

In the following, embodiments of a driving-wheel bearing device according to the present invention are described in detail. A driving-wheel bearing device according to a first embodiment illustrated in FIG. 1 includes the following as main components: a hub wheel 10 and inner race 20 which serve as inner members; double-row rolling elements 30 and 40; an outer race 50 which serves as an outer member; and a constant velocity universal joint 60. Note that, in the following description, an outer side of a vehicle in a state in which the bearing device is assembled to the vehicle is referred to as an outboard side (left side in the figures), and a middle side of the vehicle is referred to as an inboard side (right side in the figures).

The hub wheel 10 has an outboard-side inner raceway surface 12 formed on an outer peripheral surface thereof, and includes a wheel attachment flange 14 for allowing a wheel (not shown) to be attached thereto. Hub bolts 16 for fixing a wheel disk are equiangularly embedded in the wheel attachment flange 14. The inner race 20 is fitted to a small-diameter step portion 18 formed on the outer peripheral surface of the hub wheel 10, and an inboard-side inner raceway surface 22 is formed on an outer peripheral surface of the inner race 20. A female spline 11 for coupling the constant velocity universal joint 60 with the hub wheel 10 so that torque can be transmitted therebetween is formed on an inner peripheral surface of a shaft hole of the hub wheel 10.

The inner race 20 is press-fitted to the small-diameter step portion 18 of the hub wheel 10 with adequate tightening margin for the purpose of preventing creep. The outboard-side inner raceway surface 12 formed on the outer peripheral surface of the hub wheel 10 and the inboard-side inner raceway surface 22 formed on the outer peripheral surface of the inner race 20 constitute double-row inner raceway surfaces. The inner race 20 is press-fitted to the small-diameter step portion 18 of the hub wheel 10, and the end portion of the small-diameter step portion 18 of the hub wheel 10 is crimped outward. As a result, the inner race 20 is prevented from slipping off by a crimped portion 13 thus formed, and is integrated with the hub wheel 10, to thereby apply preload to a bearing section 70.

The outer race 50 has double-row outer raceway surfaces 52 and 54 formed on an inner peripheral surface thereof and opposed to the inner raceway surfaces 12 and 22 of the hub wheel 10 and the inner race 20, and includes a vehicle body attachment flange 56 for being attached to a vehicle body (not shown). The vehicle body attachment flange 56 is fixed, with use of an attachment hole 58, by bolts or the like to a knuckle extending from a suspension device (not shown) of a vehicle body.

The bearing section 70 has a double-row angular ball bearing structure, specifically, has the following structure: the rolling elements 30 and 40 are interposed between the inner raceway surfaces 12 and 22 formed on the outer peripheral surfaces of the hub wheel 10 and inner race 20 and the outer raceway surfaces 52 and 54 formed on the inner peripheral surface of the outer race 50, the rolling elements 30 and 40 in respective rows being rotatably and equiangularly retained by retainers 32 and 42.

At the openings on both ends of the bearing section 70, a pair of seals 34 and 44 for sealing annular spaces between the outer race 50 and the hub wheel 10 and between the outer race 50 and the inner race 20 so as to be held in sliding-contact with the outer peripheral surfaces of the hub wheel 10 and inner race 20 are fitted to the inner periphery at both end portions of the outer race 50. Further, the seals 34 and 44 prevent leakage of grease filling the inside and intrusion of water and foreign matters from the outside.

An outer joint member 62 of the constant velocity universal joint 60 is coupled with the hub wheel 10 described above, and hence a bearing device is constituted. The outer joint member 62 of the constant velocity universal joint 60 is provided at one end of an intermediate shaft (not shown) constituting a drive shaft, and is constituted by the following: a cup-shaped mouth section 64 housing inner components (not shown) including an inner joint member, balls, and a cage; and a stem section 66 extending integrally from a proximal portion of the mouth section 64 in an axial direction. A male spline 68 for coupling the hub wheel 10 described above with the constant velocity universal joint 60 so that torque can be transmitted therebetween is formed on an outer peripheral surface of the stem section 66.

The stem section 66 of the outer joint member 62 is press-fitted to the shaft hole of the hub wheel 10, and the male spline 68 formed on the outer peripheral surface of the stem section 66 and the female spline 11 formed on the inner peripheral surface of the shaft hole of the hub wheel 10 are fitted to each other. In this manner, torque can be transmitted. In the bearing device according to this embodiment, an annular plate 80 excellent in sliding properties is interposed between opposite surfaces of a shoulder portion 61 of the outer joint member 62 and the crimped portion 13 of the hub wheel 10, and a nut 72 is tightened to a male-screw portion 65 formed at an end portion of the stem section 66. In this manner, the constant velocity universal joint 60 is fixed to the hub wheel 10. Note that, the constant velocity universal joint 60 and the hub wheel 10 may be fixed to each other with a bolt other than the nut 72.

By a predetermined tightening force (axial force) of the nut 72, the plate 80 is sandwiched between the opposite surfaces of the shoulder portion 61 of the outer joint member 62 and the crimped portion 13 of the hub wheel 10. The plate 80 interposed between the opposite surfaces of the shoulder portion 61 of the outer joint member 62 and the crimped portion 13 of the hub wheel is provided with a molybdenum ($MoS_2$) coating layer or a fluorine-resin coating layer 81 and has a plate thickness ranging from 0.5 mm to 2 mm. Note that, the thickness of the plate 80 preferably ranges from 0.8 mm to 1 mm.

As described above, the plate 80 endowed with excellent sliding properties due to formation of the molybdenum coating layer or the fluorine-resin coating layer 81 is interposed between the opposite surfaces of the shoulder portion 61 of the outer joint member 62 and the crimped portion 13 of the hub wheel 10. As a result, even when transmitted torque between the bearing section 70 and the outer joint member 62 varies and the outer joint member 62 twists, frictional resistance is reduced between the bearing section 70 and the outer joint member 62 so that positive sliding is caused. Thus, abrupt sliding is not caused between the bearing section 70 and the outer joint member 62, and hence generation of stick-slip noise is prevented.

Further, when the thickness of the plate 80 excellent in sliding properties is set to 0.5 mm or more, the strength of the plate 80 is secured. High surface-pressure applied by the axial force to the plate 80 prevents deformation or the like of the plate 80, and hence reduction of the axial force is prevented over a long period of time. Anti stick-slip properties are secured in this manner. Meanwhile, when the thickness of the plate 80 is set to 2 mm or less, compact design can be secured without increase in axial dimension of the bearing device.

When the thickness of the plate 80 is less than 0.5 mm, it is difficult to secure the strength of the plate 80, which may lead to such a risk that the plate 80 is liable to be deformed in a case of being applied with high surface-pressure by the axial force, and that the axial force is reduced, which may cause a breakage of the plate 80. Further, when the thickness of the plate 80 is more than 2 mm, the axial dimension of the bearing device is increased, which leads to difficulty in compactification of the device.

The film thickness of the molybdenum coating layer or the fluorine-resin coating layer 81 formed on the plate 80 is set within a range from 2 μm to 30 μm. When the film thickness of the molybdenum coating layer or the fluorine-resin coating layer 81 is set to 2 μm or more, the molybdenum coating layer or the fluorine-resin coating layer 81 is not worn early. Further, when the film thickness of the molybdenum coating layer or the fluorine-resin coating layer 81 is set to 30 μm or less, use amount of a coating material is minimized, and hence cost increase is not involved. In addition, the coating layer 81 itself is not crushed even when high surface-pressure is applied by the axial force to the plate 80, and hence reduction of the axial force is prevented, and hence the nut 72 is prevented from being loosened.

When the film thickness of the coating layer 81 is less than 2 μm, there is a risk that the coating layer 81 is worn early. Further, when the film thickness of the coating layer 81 is more than 30 μm, use amount of a coating material is increased, which leads to cost increase. In addition, the coating layer 81 itself is crushed when high surface-pressure is applied by the axial force to the plate 80, which leads to reduction of the axial force and formation of a gap between the opposite surfaces of an inboard-side end portion of the bearing section and the shoulder portion of the outer joint member. When the wheel bearing device is of a type that the inboard-side end portion of the bearing section is not crimped outward (type that the inner race of the bearing section and the shoulder portion of the constant velocity universal joint are held in direct contact with each other), there occurs a failure of impairing durability of the bearing section.

The material of the plate 80 is stainless steel. When the plate 80 is formed of stainless steel as just described above, the plate 80 itself can be caused to yield corrosion-resistance effect. As a result, generation of stain is prevented, and hence use environment can also be coped with in which corrosion-resistance properties such as those of automobiles are required over a long period of time.

Further, the yield strength of the plate 80 is set to 205 N/mm² or more. When the yield strength of the plate 80 is set to 205 N/mm² or more as just described above, deformation of the plate 80 is prevented even when high surface-pressure is applied by the axial force to the plate 80, and hence reduction of the axial force is prevented.

In the first embodiment described above, the case is described where the present invention is applied to a bearing device of the following type: the small-diameter step portion 18 is formed on the outer peripheral surface of the hub wheel 10, the one-side inner raceway surface 12 being formed on the outer peripheral surface; the inner race 20 provided with the other-side inner raceway surface 22 is press-fitted to the small-diameter step portion 18; and the end portion of the small-diameter step portion 18 of the hub wheel 10 is crimped. However, the present invention is not limited thereto.

Figure 2:
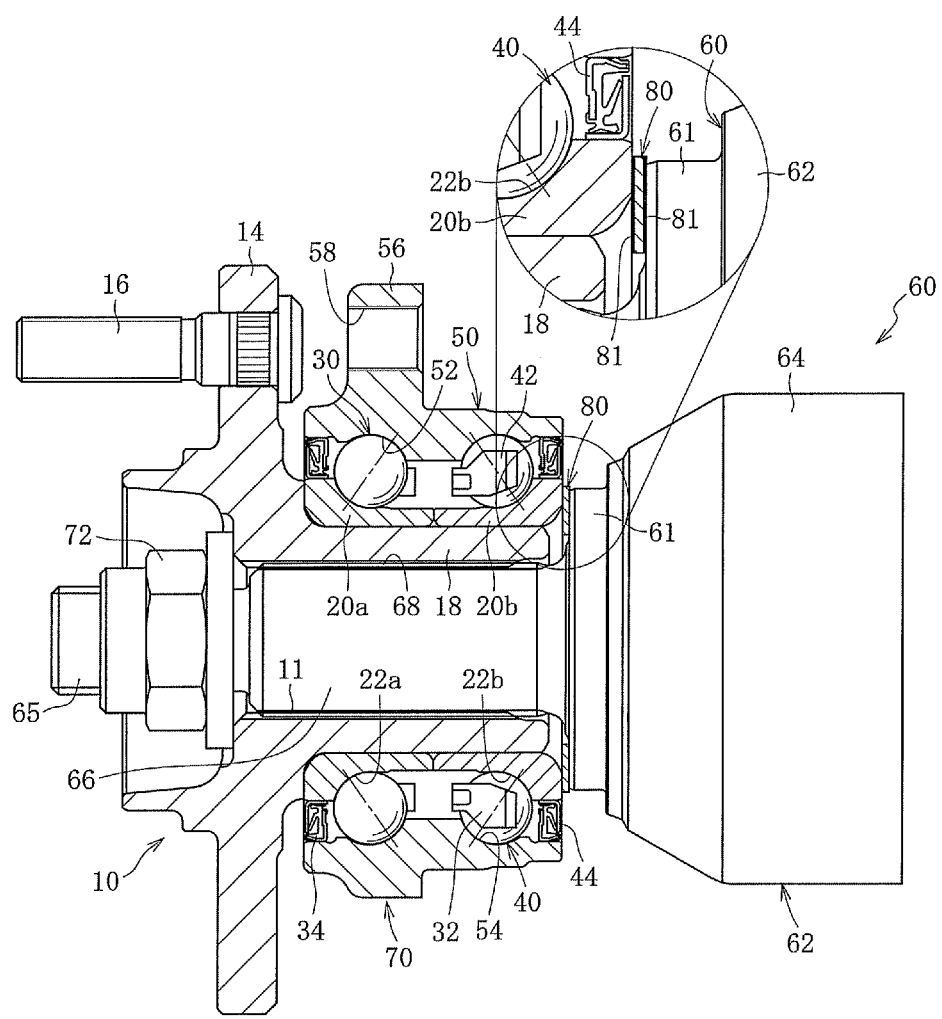
FIG. 2 is a vertical sectional view illustrating an application example of a second embodiment of the present invention, in which the plate is interposed between an inboard-side end portion of an inner race and the shoulder portion of the outer joint member.

For example, as illustrated in FIG. 2, the present invention is applicable to a bearing device of the following type: a pair of inner races 20a and 20b are fitted to the outer peripheral surface of the hub wheel 10; an outboard-side inner raceway surface 22a is formed on an outer peripheral surface of the one-side inner race 20a; and an inboard-side inner raceway surface 22b is formed on an outer peripheral surface of the other-side inner race 20b.

In a second embodiment of the present invention illustrated in FIG. 2, an inboard-side end portion of the other-side inner race 20b positioned on an inboard side is opposed to the shoulder portion 61 of the outer joint member 62. Thus, the plate 80 described in the first embodiment is interposed between the inboard-side end portion of the inner race 20b and the shoulder portion 61 of the outer joint member 62. Note that, the plate 80 is similar to that described above in the first embodiment in constitution, that is, in the following points: the molybdenum coating layer or the fluorine-resin coating layer 81 is formed thereon and the plate 80 has a plate thickness ranging from 0.5 mm to 2 mm; the film thickness of the molybdenum coating layer or the fluorine-resin coating layer 81 is set within a range from 2 μm to 30 μm; the material of the plate 80 is stainless steel; and the yield strength of the plate 80 is set to 205 N/mm² or more, and in functions and advantages. Therefore, redundant description thereof is omitted. In the second embodiment, the plate 80 also has an advantage of preventing durability of the bearing section 70 from being reduced owing to reduction of the axial force.

Further, in the first embodiment illustrated in FIG. 1 and the second embodiment illustrated in FIG. 2, the case is described where the annular plate 80 is used. However, as in a third embodiment of the present invention illustrated in FIG. 3 and a fourth embodiment of the present invention illustrated in FIG. 4, a plate 82 may be used which has an annular portion 82a and a cylindrical portion 82b. In the third embodiment illustrated in FIG. 3, similar to the first embodiment, the present invention is applied to a bearing device of a type that the end portion of the small-diameter step portion 18 of the hub wheel 10 is crimped; in the fourth embodiment illustrated in FIG. 4, similar to the second embodiment, the present invention is applied to a bearing device of a type that the pair of inner races 20a and 20b are fitted to the outer peripheral surface of the hub wheel 10.

The plate 82 according to the third embodiment has a structure constituted by the following: the annular portion 82a interposed between the two opposite surfaces of the shoulder portion 61 of the outer joint member 62 and the crimped portion 13 of the hub wheel 10; and the cylindrical portion 82b formed of an outer peripheral edge of the annular portion 82a, the outer peripheral edge being elongated to an axial inboard side and fitted to the shoulder portion 61 of the outer joint member 62. Similarly, the plate 82 according to the fourth embodiment has a structure constituted by the following: the annular portion 82a interposed between the two opposite surfaces of the shoulder portion 61 of the outer joint member 62 and the inboard-side end portion of the inner race 20b; and the cylindrical portion 82b formed of an outer peripheral edge of the annular portion 82a, the outer peripheral edge being elongated to an axial inboard side and fitted to the shoulder portion 61 of the outer joint member 62.

Each of the plates 82 is provided with a molybdenum coating layer or a fluorine-resin coating layer 83 and has a plate thickness ranging from 0.5 mm to 2 mm. Further, the film thickness of the molybdenum coating layer or the fluorine-resin coating layer 83 formed on each of the plates 82 is set within a range from 2 μm to 30 μm. In addition, the material of the plates 82 is stainless steel, and the yield strength thereof is set to 205 N/mm² or more. Functions and advantages yielded by the annular portion 82a of each of the plates 82 constituted as described above are similar to those of the annular plates 80 in the first embodiment illustrated in FIG. 1 and the second embodiment illustrated in FIG. 2, and hence redundant description thereof is omitted.

With use of the plates 82 structured as described above, each of the plate 82 can be assembled to the outer joint member 62 by fitting of the cylindrical portion 82b of each of the plates 82 to the shoulder portion 61 of the outer joint member 62. As a result, the plates 82 can be handled more easily. Further, in the case of the third embodiment, the annular portion 82a of the plate 82 can be easily positioned between the opposite surfaces of the crimped portion 13 of the hub wheel 10 and the shoulder portion 61 of the outer joint member 62; in the case of the fourth embodiment, the annular portion 82a of the plate 82 can be easily positioned between the opposite surfaces of the inboard-side end portion of the inner race 20b and the shoulder portion 61 of the outer joint member 62.

Figure 3:
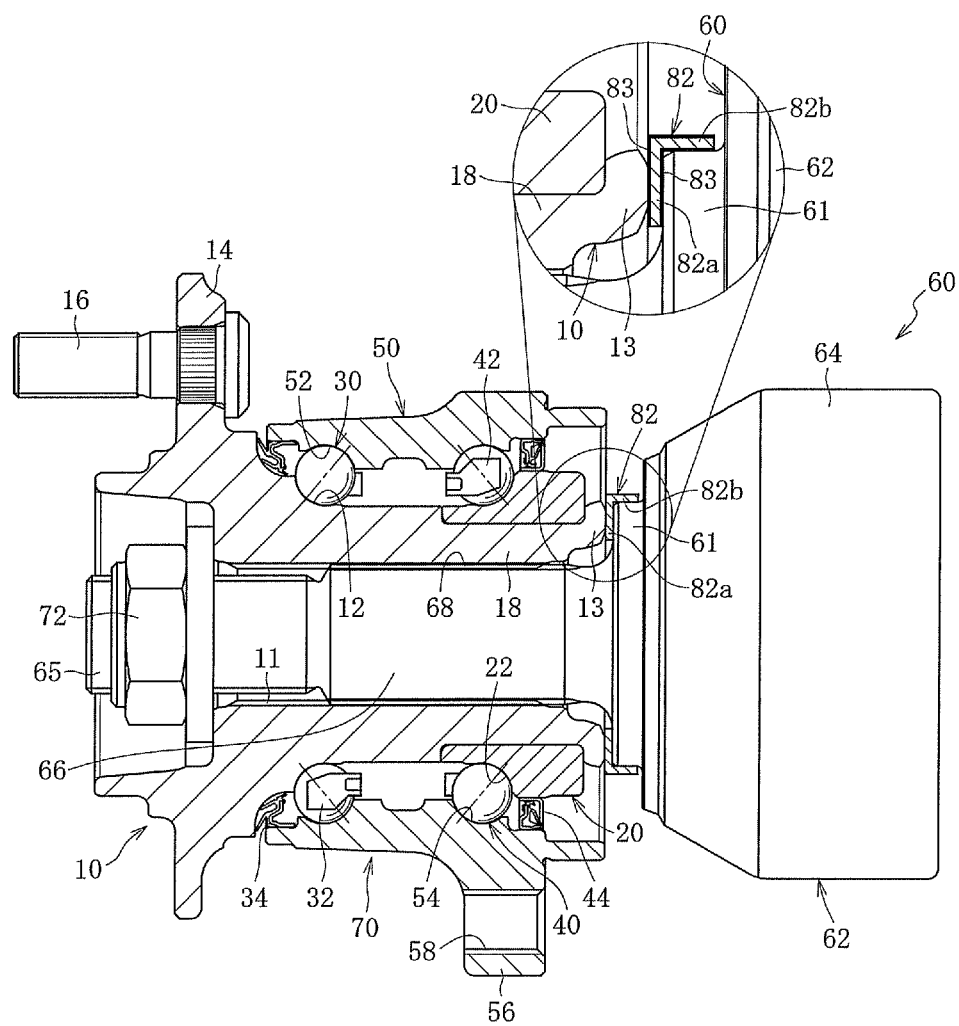
FIG. 3 is a vertical sectional view illustrating an application example of a third embodiment of the present invention, in which a plate assembled to the outer joint member is interposed between the crimped portion of the hub wheel and the shoulder portion of the outer joint member.
Figure 4:
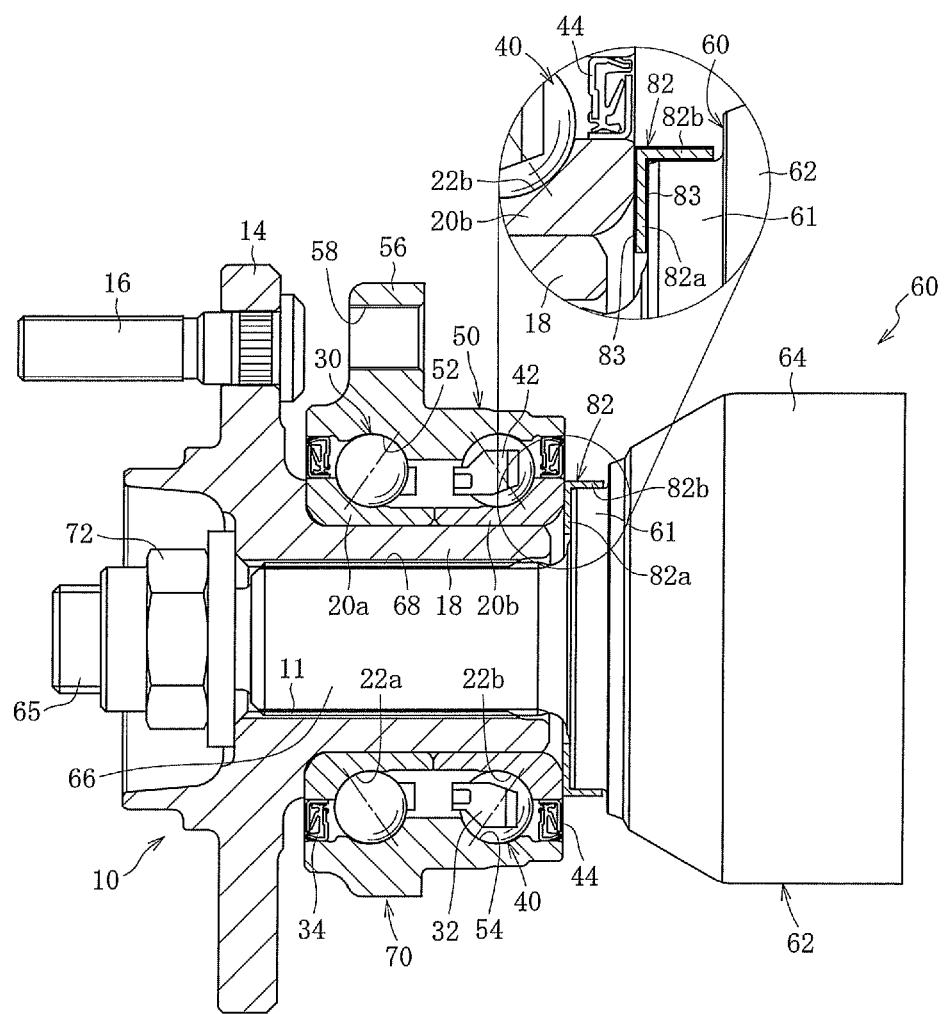
FIG. 4 is a vertical sectional view illustrating an application example of a fourth embodiment of the present invention, in which the plate assembled to the outer joint member is interposed between the inboard-side end portion of the inner race and the shoulder portion of the outer joint member.

In the third embodiment illustrated in FIG. 3 and the fourth embodiment illustrated in FIG. 4, the case is described where each of the plates 82 has a structure in which an outer peripheral edge of the annular portion 82a is elongated to the axial inboard side and the cylindrical portion 82b is fitted to the shoulder portion 61 of the outer joint member 62, and hence each of the plates 82 can be assembled to the outer joint member 62. However, the present invention is not limited thereto, and it is also possible to use plates 84 and 86 which respectively have structures in a fifth embodiment of the present invention illustrated in FIG. 5 and a sixth embodiment of the present invention illustrated in FIG. 6.

Figure 5:
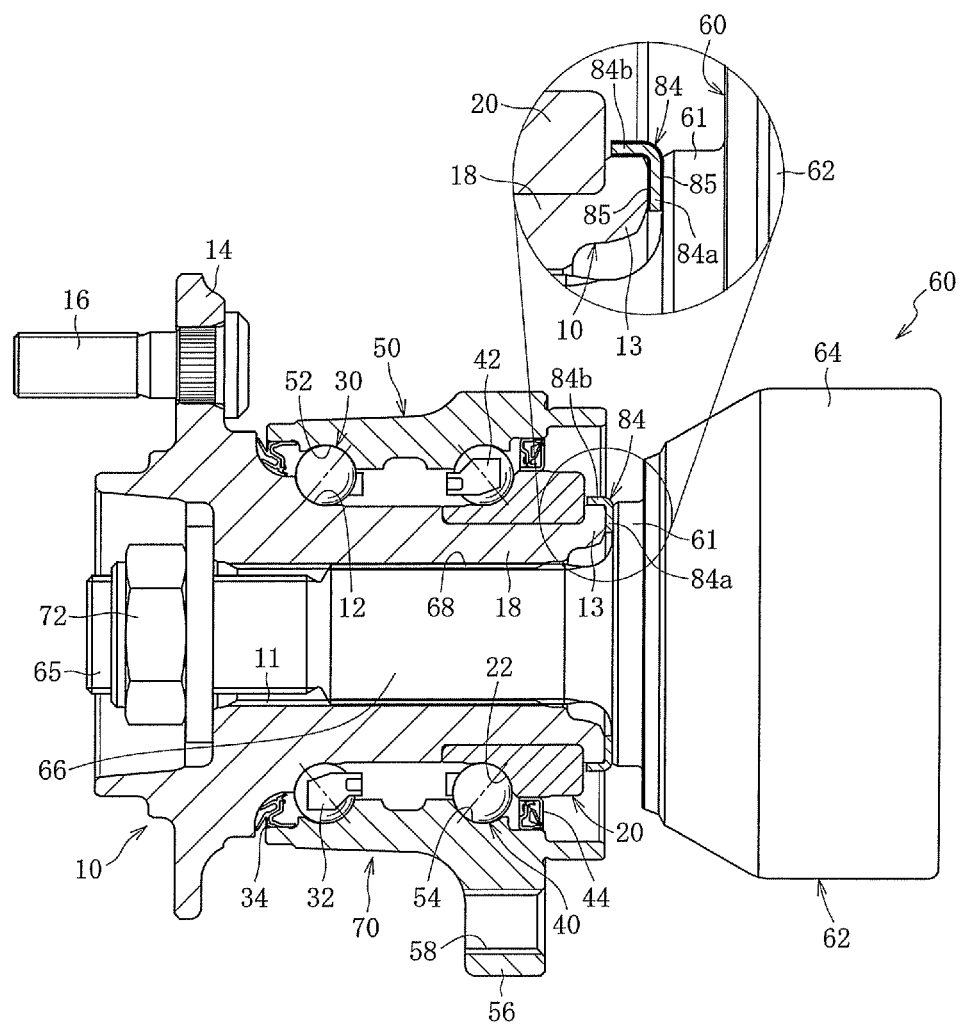
FIG. 5 is a vertical sectional view illustrating an application example of a fifth embodiment of the present invention, in which a plate assembled to a bearing section is interposed between the crimped portion of the hub wheel and the shoulder portion of the outer joint member.
Figure 6:
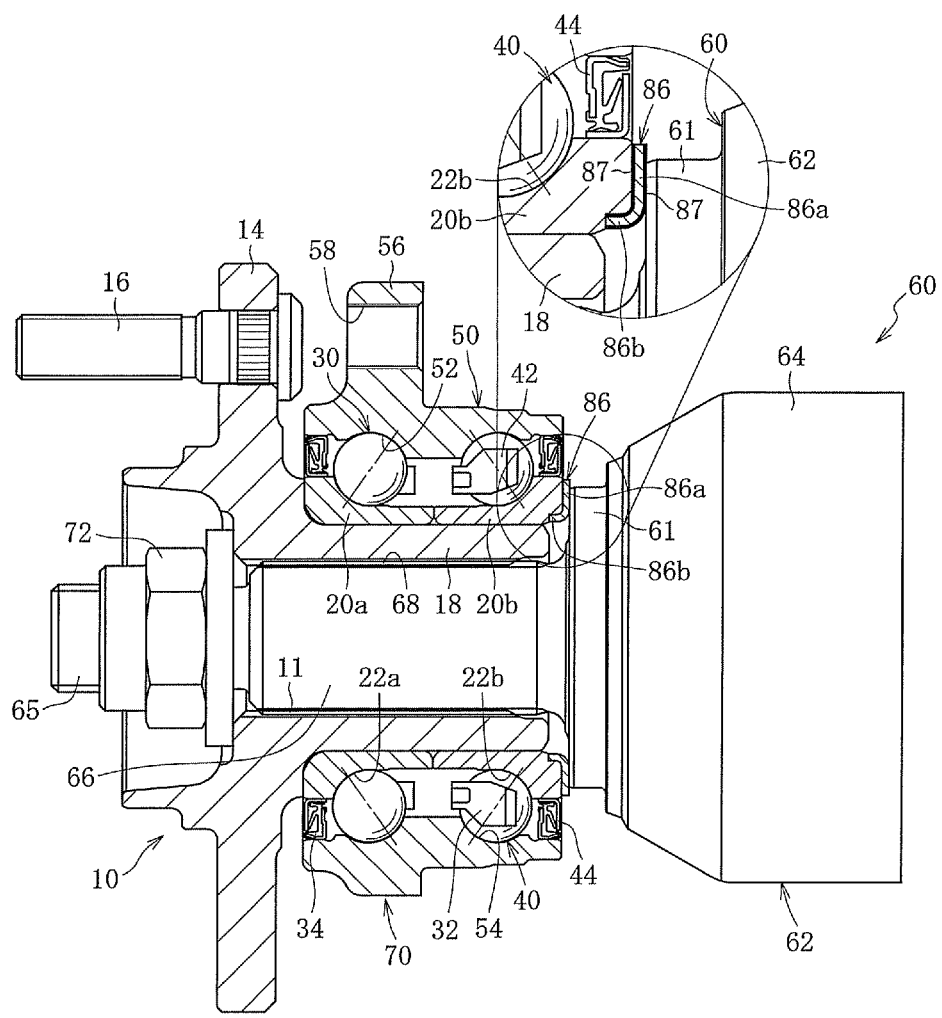
FIG. 6 is a vertical sectional view illustrating an application example of a sixth embodiment of the present invention, in which a plate assembled to the bearing section is interposed between the inboard-side end portion of the inner race and the shoulder portion of the outer joint member.

Note that, in the fifth embodiment illustrated in FIG. 5 is, similar to the third embodiment, the present invention is applied to a bearing device of a type that the end portion of the small-diameter step portion 18 of the hub wheel 10 is crimped; in the sixth embodiment illustrated in FIG. 6, similar to the fourth embodiment, the present invention is applied to a bearing device of a type that the pair of inner races 20a and 20b are fitted to the outer peripheral surface of the hub wheel 10.

The plate 84 according to the fifth embodiment has a structure constituted by the following: an annular portion 84a interposed between the two opposite surfaces of the shoulder portion 61 of the outer joint member 62 and the crimped portion 13 of the hub wheel 10; and a cylindrical portion 84b formed of an outer peripheral edge of the annular portion 84a, the outer peripheral edge being elongated to an axial outboard side and fitted to the inboard-side end portion of the inner race 20. Meanwhile, the plate 86 according to the sixth embodiment has a structure constituted by the following: the annular portion 84a interposed between the two opposite surfaces of the shoulder portion 61 of the outer joint member 62 and the inboard-side end portion of the inner race 20b; and a cylindrical portion 86b formed of an inner peripheral edge of the annular portion 84a, the outer peripheral edge being elongated to the axial outboard side and fitted to the inboard-side end portion of the inner race 20b.

The plates 84 and 86 are provided with molybdenum coating layers or fluorine-resin coating layers 85 and 87, respectively, and each has a plate thickness ranging from 0.5 mm to 2 mm. Further, the film thickness of the molybdenum coating layer or the respective fluorine-resin coating layers 85 and 87 formed on the plates 84 and 86 is set within a range from 2 μm to 30 μm. In addition, the material of the plates 84 and 86 is stainless steel, and the yield strength thereof is set to 205 N/mm$^2$ or more. Functions and advantages yielded by the respective annular portion 84a and 86a of the plates 84 and 86 constituted as described above are similar to those of the annular plates 80 in the first embodiment illustrated in FIG. 1 and the second embodiment illustrated in FIG. 2, and hence redundant description thereof is omitted.

With use of the plates 84 and 86, the plates 84 and 86 can be assembled to the bearing section 70 by fitting of the cylindrical portion 84b of the plate 84 to the crimped portion 13 of the hub wheel 10 in the case of the fifth embodiment, and by fitting of the cylindrical portion 86b of the plate 86 to the inboard-side end portion of the inner race 20b in the case of the sixth embodiment. As a result, the plates 84 and 86 can be handled more easily. Further, in the case of the fifth embodiment, the annular portion 84a of the plate 84 can be easily positioned between the opposite surfaces of the crimped portion 13 of the hub wheel 10 and the shoulder portion 61 of the outer joint member 62; in the case of the sixth embodiment, the annular portion 86b of the plate 86 can be easily positioned between the opposite surfaces of the inboard-side end portion of the inner race 20b and the shoulder portion 61 of the outer joint member 62.

Figure 7:
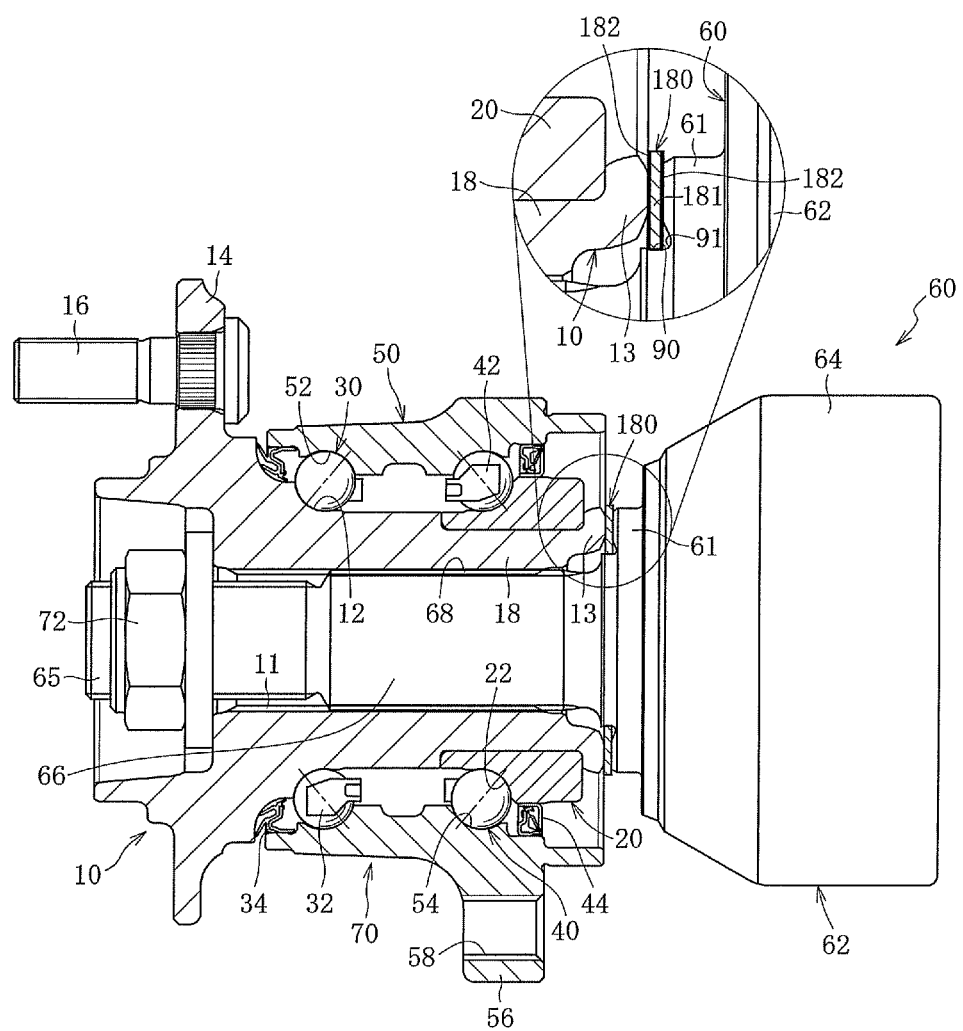
FIG. 7 is a vertical sectional view illustrating an application example of a seventh embodiment of the present invention, in which a plate is interposed between the crimped portion of the hub wheel and the shoulder portion of the outer joint member.

In a seventh embodiment of the present invention illustrated in FIG. 7, a plate 180 is sandwiched by a predetermined tightening force (axial force) of the nut 72 between the opposite surfaces of the shoulder portion 61 of the outer joint member 62 and the crimped portion 13 of the hub wheel 10. The plate 180 interposed between the opposite surfaces of the shoulder portion 61 of the outer joint member 62 and the crimped portion 13 of the hub wheel 10 is endowed with predetermined sliding properties by coating of surfaces of a substrate 181 thereof with a film 182 containing a fluorine resin or molybdenum disulfide. Further, the surface roughness of the plate 180 prior to coating, that is, the surface roughness of the coating-object substrate 181 is set to be Rz=0.2~15.0. The surface roughness of the plate 180 prior to coating is preferably set to be Rz=0.3~10.0.

Note that, in the seventh embodiment, although a case is illustrated where both an outer-joint-member-side surface and hub-wheel-side surface of the substrate 181 are subjected to coating, only the outer-joint-member-side surface of the substrate 181 may be subjected to coating, or only the hub-wheel-side surface of the substrate 181 may be subjected to coating. The surface roughness (Rz=0.2~15.0) described above is set for the coating-object surfaces of the substrate 181.

Further, in order to secure excellent sliding properties, the plate 180 is subjected to coating with the film 182 containing a fluorine resin or molybdenum disulfide. Any of the following cases may be applied: a case of effecting coating with the film 182 containing only a fluorine resin; a case of effecting coating with the film 182 containing only molybdenum disulfide; and a case of effecting coating with a film 182 containing both a fluorine resin and molybdenum disulfide.

As described above, the plate 180 endowed with excellent sliding properties due to coating of the surfaces of the substrate 181 is interposed between the opposite surfaces of the shoulder portion 61 of the outer joint member 62 and the crimped portion 13 of the hub wheel 10. As a result, even when transmitted torque between the bearing section 70 and the outer joint member 62 varies and the outer joint member 62 twists, frictional resistance is reduced between the bearing section 70 and the outer joint member 62 so that positive sliding is caused. Thus, abrupt sliding is not caused between the bearing section 70 and the outer joint member 62, and hence generation of stick-slip noise is prevented.

By setting of the surface roughness of the coating-object substrate 181 of the plate 180 to be Rz=0.2~15.0, a coating material containing a fluorine resin or molybdenum disulfide is more easily applied onto the surfaces of the substrate 181, and hence adhesion properties of the coating material with respect to the surfaces of the substrate 181 are enhanced. As a result, even when rotational torque is input, problems such as early peeling-off and early wearing of the coating material are prevented, and hence functions of the coating material is sufficiently yielded more easily.

In this embodiment, the case is illustrated where both the outer-joint-member-side surface and hub-wheel-side surface of the substrate 181 are subjected to coating. In this context, although it is necessary to set the surface roughness of both the surfaces of the substrate 181 to be Rz=0.2~15.0, only the outer-joint-member-side surface of the substrate 181 may be subjected to coating. Alternatively, when only the hub-wheel-side surface of the substrate 181 is subjected to coating, it is only necessary that the surface roughness of the coating-object outer-joint-member-side surface or hub-wheel-side surface be set to be Rz=0.2~15.0.

When the surface roughness of the coating-object substrate 181 is less than Rz=0.2, adhesion properties between the surfaces of the substrate 181 and the coating material are reduced. Thus, when rotational torque is input in a state in which the plate 180 is interposed between the bearing section 70 and the shoulder portion 61 of the outer joint member 62, the coating material is caused to be peeled off early, and hence it is difficult to sufficiently yield the functions of the coating material. In contrast, when the surface roughness of the coating-object substrate 181 is more than Rz=15.0, surface pressure of protruding portions on the surface thereof becomes higher, and hence problems such as early wearing of the coating material occur on that portions. Also in this case, it is difficult to sufficiently yield the functions of the coating material.

Figure 9:
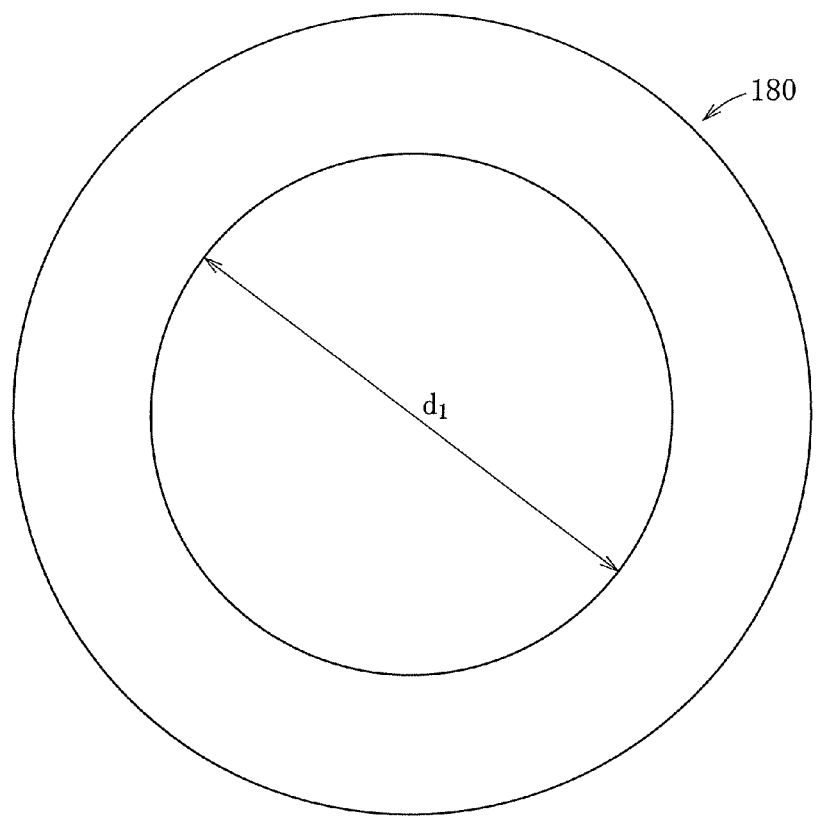
FIG. 9 is a side view of the plate having a radially-inner circular shape.
Figure 10:
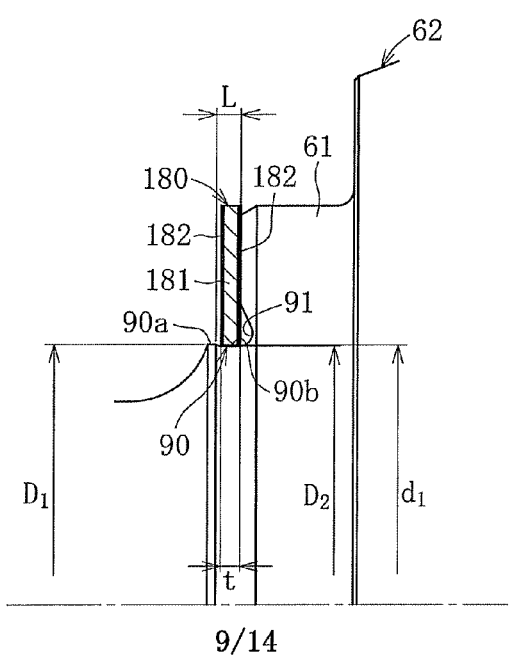
FIG. 10 is a partially enlarged view of a state in which the plate of FIG. 9 is assembled to the shoulder portion of the outer joint member.

As illustrated in FIGS. 8B and 10, a recess groove 90 into which an inner periphery of the plate 180 is fitted is formed on the shoulder portion 61 of the outer joint member 62 with which the plate 180 illustrated in FIGS. 8A and 9 comes into contact, and an escape portion 91 is provided at an innermost part of the recess groove 90 into which the plate 180 is fitted. Note that, the recess groove 90 has a large-diameter inlet portion 90a through which the plate 180 is inserted and a small-diameter groove-bottom portion 90b into which the plate 180 is fitted.

As described above, the recess groove 90 into which the inner periphery of the plate 180 is fitted is provided to the shoulder portion 61 of the outer joint member 62. With this configuration, the plate 180 can be easily assembled to the shoulder portion 61 of the outer joint member 62, and easily positioned and interposed between the crimped portion 13 of the hub wheel 10 and the shoulder portion 61 of the outer joint member 62 in a state in which the plate 180 is assembled to the outer joint member 62. Further, the escape portion 91 is provided at the innermost part of the recess groove 90. With this configuration, fitting work is facilitated when the plate 180 is fitted into the recess groove 90 of the shoulder portion 61 of the outer joint member 62.

In this context, when the inner diameter of the plate 180 is defined as $d_1$, the thickness thereof as t, the diameter of the inlet portion 90a of the recess groove 90 of the outer joint member 62 as $D_1$, the diameter of the groove-bottom portion 90b as $D_2$, and an axial length as L, the following relations are established: $D_2<d_1<D_1$ and t<L. With this setting, the plate 180 can be easily assembled to the shoulder portion 61 of the outer joint member 62, and is not slipped off from the outer joint member 62 at the time of handling or the like in the state in which the plate 180 is assembled to the outer joint member 62. As a result, assembling properties and handling properties of the plate 180 are enhanced. Note that, when the difference between the diameter $D_1$ of the inlet portion 90a of the recess groove 90 and the inner diameter $d_1$ of the plate 180 is defined as $0<D_1-d_1<0.5$, the plate 180 can be easily assembled to the extent of being attachable by hand.

In the seventh embodiment described above, the case is described where the present invention is applied to a bearing device of the following type: the small-diameter step portion 18 is formed on the outer peripheral surface of the hub wheel 10, the one-side inner raceway surface 12 being formed on the outer peripheral surface; the inner race 20 provided with the other-side inner raceway surface 22 is press-fitted to the small-diameter step portion 18; and the end portion of the small-diameter step portion 18 of the hub wheel 10 is crimped. However, the present invention is not limited thereto.

Figure 11:
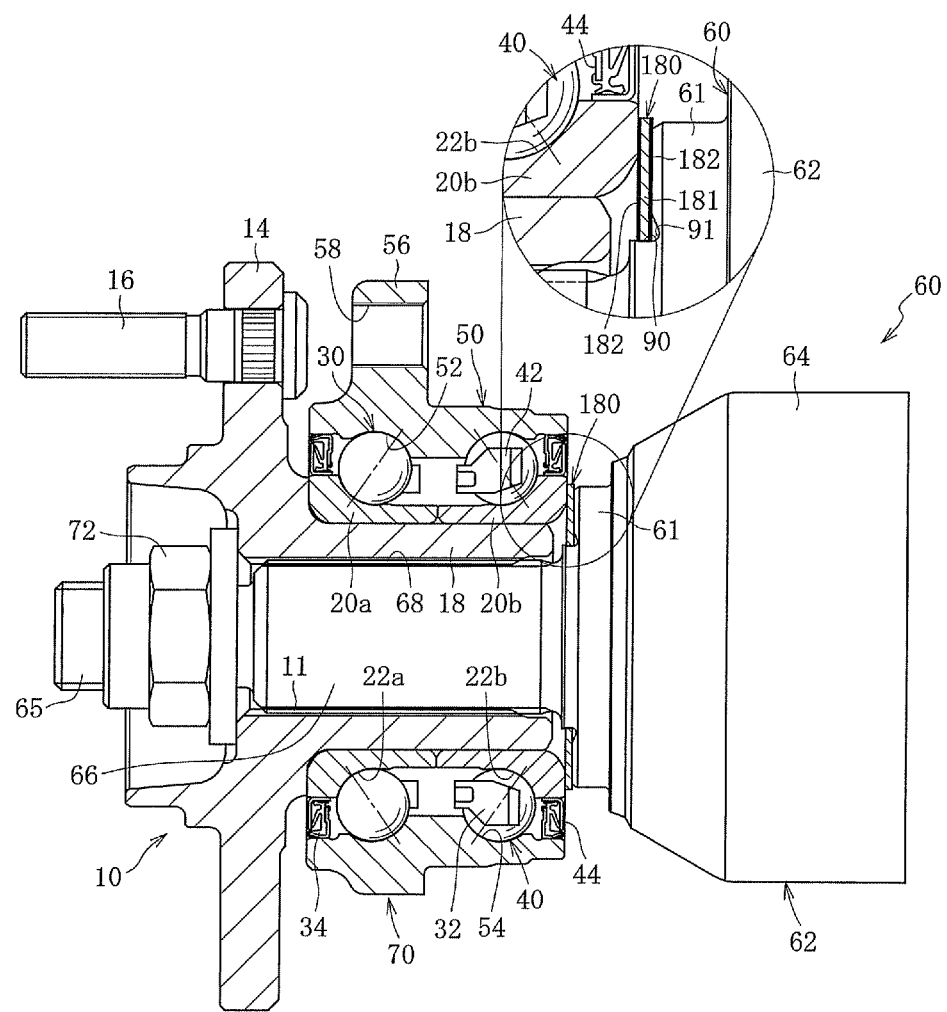
FIG. 11 is a vertical sectional view illustrating an application example of an eighth embodiment of the present invention, in which the plate is interposed between the inboard-side end portion of the inner race and the shoulder portion of the outer joint member.

For example, as illustrated in FIG. 11, the present invention is applicable to a bearing device of the following type: the pair of inner races 20a and 20b are fitted to the outer peripheral surface of the hub wheel 10; the outboard-side inner raceway surface 22a is formed on the outer peripheral surface of the one-side inner race 20a; and the inboard-side inner raceway surface 22b is formed the outer peripheral surface of the other-side inner race 20b.

In an eighth embodiment of the present invention illustrated in FIG. 11, the inboard-side end portion of the other-side inner race 20b positioned on the inboard side is opposed to the shoulder portion 61 of the outer joint member 62. Thus, the plate 180 described in the seventh embodiment is interposed between the inboard-side end portion of the inner race 20b and the shoulder portion 61 of the outer joint member 62.

Note that, the plate 180 is similar to that described above in the seventh embodiment of the present invention in the following points: the plate 180 is endowed with predetermined sliding properties by coating of the surfaces of the substrate 181 thereof with the film 182 containing a fluorine resin or molybdenum disulfide, and the surface roughness of the coating-object substrate 181 of the plate 180 is preferably set to be Rz=0.2~15.0 (preferably, Rz=0.3~10.0); the recess groove 90 and the escape portion 91 are provided to the shoulder portion 61 of the outer joint member 62; the relations between the plate 180 and the recess groove 90 are established as follows: $D_2<d_1<D_1$, t<L, and $0<D_1-d_1<0.5$; and in functions and advantages. Therefore, redundant description thereof is omitted.

Figure 12:
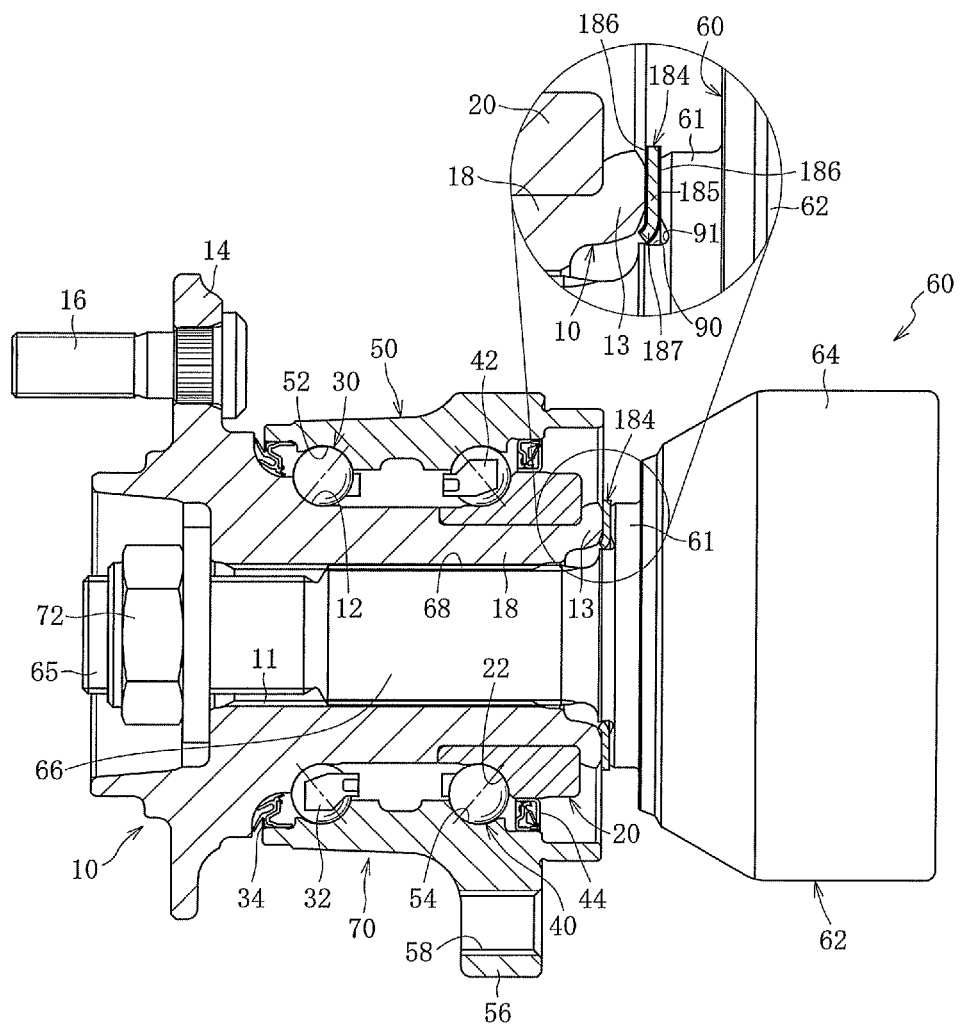
FIG. 12 is a vertical sectional view illustrating an application example of a ninth embodiment of the present invention, in which a plate is interposed between the crimped portion of the hub wheel and the shoulder portion of the outer joint member.
Figure 13:
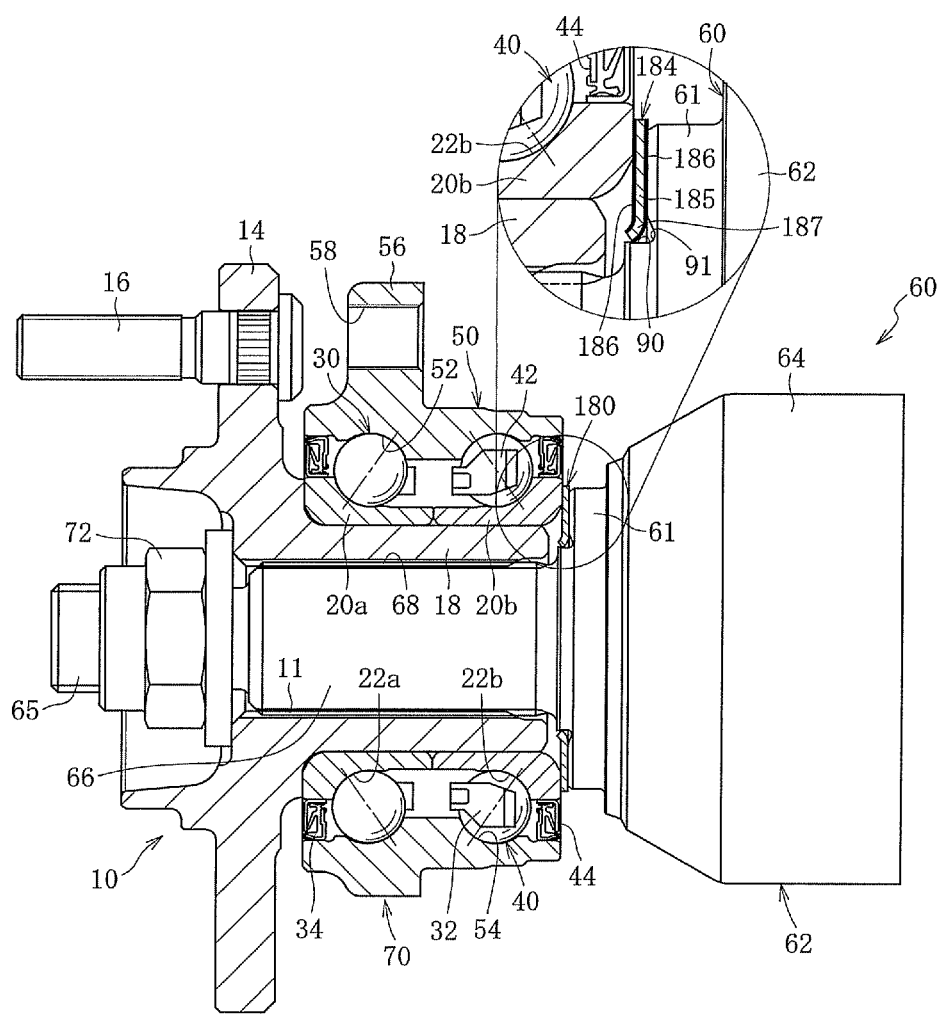
FIG. 13 is a vertical sectional view illustrating an application example of a tenth embodiment of the present invention, in which the plate is interposed between the inboard-side end portion of the inner race and the shoulder portion of the outer joint member.

In the seventh and eighth embodiments described above, a case is illustrated where the inner periphery of the plate 180 is formed in a circular shape (refer to FIG. 9). However, the present invention is not limited thereto, and it is also possible to use a plate 184 as in a ninth embodiment of the present invention illustrated in FIG. 12 and a tenth embodiment of the present invention illustrated in FIG. 13.

Note that, in the ninth embodiment, similar to the seventh embodiment, the case is described where the present invention is applied to a bearing device of a type that the inner race 20 is press-fitted to the small-diameter step portion 18 of the hub wheel 10 and then the end portion of the small-diameter step portion 18 of the hub wheel 10 is crimped. In this case, the plate 184 is interposed between the crimped portion 13 of the hub wheel 10 and the shoulder portion 61 of the outer joint member 62.

Further, in the tenth embodiment, similar to the eighth embodiment, the case is described where the present invention is applied to a bearing device of a type that the pair of inner races 20a and 20b are fitted to the outer peripheral surface of the hub wheel 10. In this case, the plate 184 is interposed between the inboard-side end portion of the inner race 20b and the shoulder portion 61 of the outer joint member 62.

The plate 184 is similar to that described above in the seventh embodiment of the present invention in the following points: the plate 184 is endowed with predetermined sliding properties by coating of surfaces of a substrate 185 thereof with a film 186 containing a fluorine resin or molybdenum disulfide, and the surface roughness of the coating-object substrate 185 of the plate 184 is preferably set to be Rz=0.2~15.0 (preferably, Rz=0.3~10.0); the recess groove 90 and the escape portion 91 are provided to the shoulder portion 61 of the outer joint member 62; the relations between the plate 184 and the recess groove 90 are established as follows: $D_2<d_1<D_1$, t<L, and $0<D_1-d_1<0.5$; and in functions and advantages. Therefore, redundant description thereof is omitted.

Figure 14:
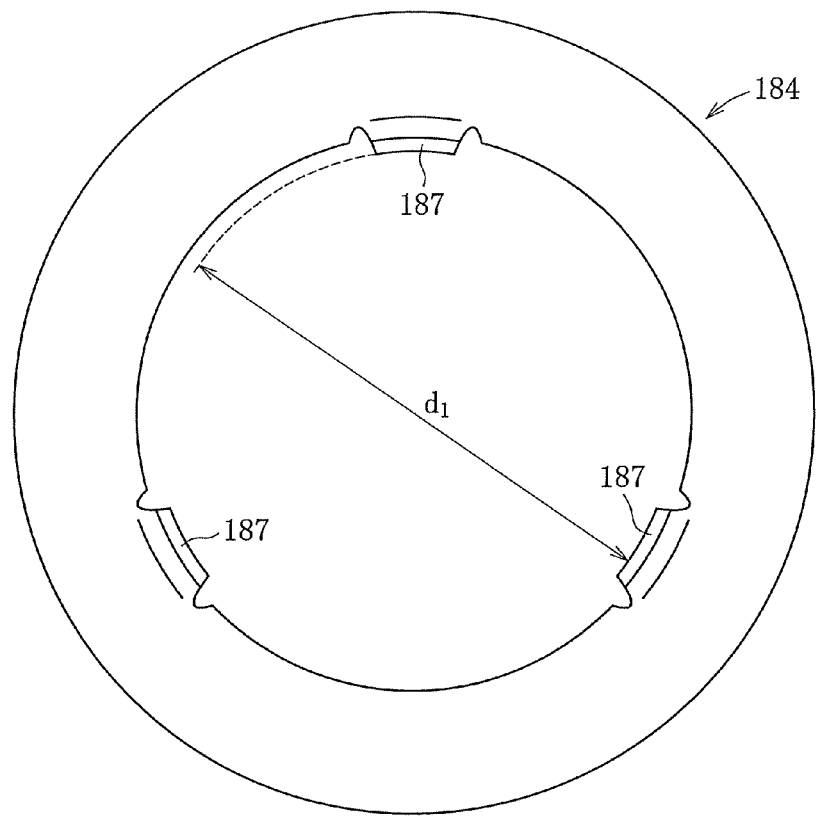
FIG. 14 is a side view of the plate having protrusions provided on an inner periphery thereof.
Figure 15:
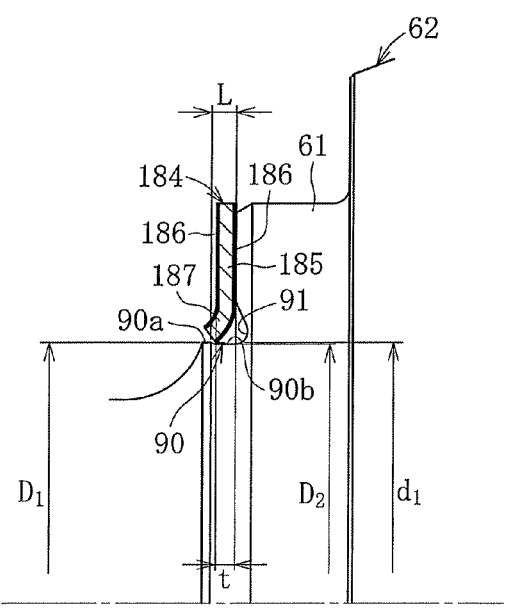
FIG. 15 is a partially enlarged view of a state in which the plate of FIG. 14 is assembled to the shoulder portion of the outer joint member.
Figure 16:
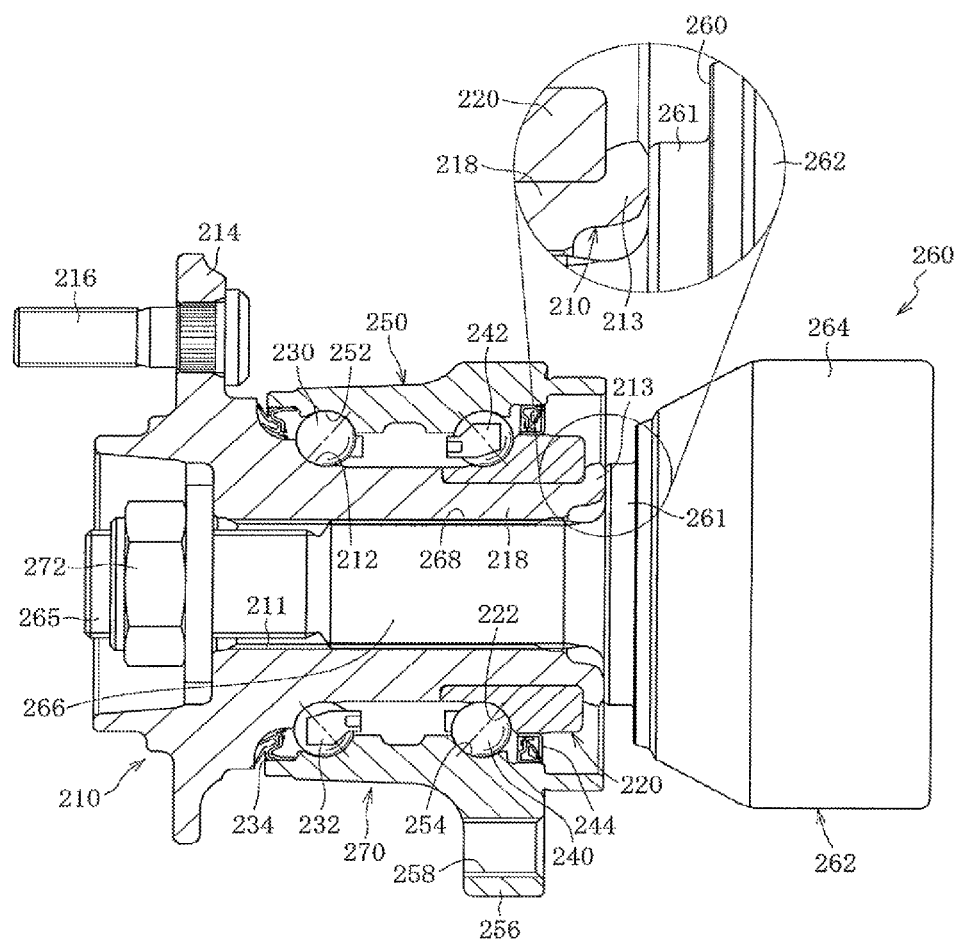
FIG. 16 is a vertical sectional view illustrating a conventional example of a driving-wheel bearing device.

In the ninth and tenth embodiments, as illustrated in FIGS. 14 and 15, claw-like protrusions 187 are provided on an inner periphery of the plate 184. In those embodiments, three protrusions 187 are equiangularly formed on the inner periphery of the plate 184. Note that, in the relations between the plate 184 and the recess groove 90, that is, in the relations of $D_2<d_1<D_1$, $t<L$, and $0<D_1-d_1<0.5$, the inner diameter $d_1$ of the plate 184 is defined as an inner diameter measured from each of the portions corresponding to the protrusions 187 provided on the inner periphery thereof.

With provision of the claw-like protrusions 187 on the inner periphery of the plate 184 as in those ninth and tenth embodiments, mountability of the plate 184 is enhanced. In other words, with provision of the claw-like protrusions 187, for example, at three points along the circumferential direction of the inner periphery of the plate 184, only the parts corresponding to the protrusions 187 come into contact with the shoulder portion 61 of the outer joint member 62 in the circumferential direction of the inner periphery of the plate 184, and hence the plate 184 is more easily mounted to the outer joint member 62. Note that, an inner end portion of each of the protrusions 187 is formed in a shape of being bent to the crimped portion 13 of the hub wheel 10, and hence the plate 184 can be more easily fitted and less liable to be disengaged.

In the seventh to tenth embodiments described above, lubricant may be interposed in any one of a gap between each of the plate 180 and 184 and the shoulder portion 61 of the outer joint member 62 and a gap between each of the plate 180 and 184 and the crimped portion 13 of the hub wheel 10. Alternatively, lubricant may be interposed in both the gap between each of the plate 180 and 184 and the shoulder portion 61 of the outer joint member 62 and the gap between each of the plate 180 and 184 and the crimped portion 13 of the hub wheel 10.

When the lubricant is interposed as described above, the frictional resistance is further reduced between the bearing section 70 and the outer joint member 62 so that positive sliding easily occurs, with the result that generation of stick-slip noise is more reliably prevented.

The present invention is not limited to the embodiments described above, and as a matter of course, may be carried out in other various embodiments without departing from the spirit of the present invention. The scope of the present invention is defined in the scope of claims, and includes meaning of equivalents of elements described in the scope of claims and all modifications in the scope of claims.

The invention claimed is:

1. A driving-wheel bearing device, comprising:
an outer member having a shoulder portion, and double-row outer raceway surfaces on an inner periphery thereof;
an inner member comprising a hub wheel and an inner race, the inner member having a crimped end portion, a wheel attachment flange at one end thereof and double-row inner raceway surfaces on an outer periphery thereof; and
double-row rolling elements interposed between the double-row outer raceway surfaces of the outer member and the double-row inner raceway surfaces of the inner member,
wherein the hub wheel has a shaft hole into which a stem section extending from an outer joint member of a constant velocity universal joint is capable of being spline-fitted by being press-fitted,
wherein a plate having predetermined sliding properties is interposed between opposite surfaces of a shoulder portion of the outer joint member and the crimped end portion of the inner member,
wherein claw-like protrusions are provided on an inner periphery of the plate,
wherein an inner end portion of each of the claw-like protrusions is formed in a shape of being bent to the crimped end portion of the inner member,
wherein an inner diameter $d_1$ corresponding to the claw-like protrusions of the plate is bigger than an outer diameter $D_2$ of a portion to which the inner periphery of the plate is fitted, and
wherein an inner diameter of the inner periphery of the plate other than where the claw-like protrusions are located is bigger than the inner diameter $d_1$ corresponding to the claw-like protrusions.

2. A driving-wheel bearing device according to claim 1, wherein the portion to which the inner periphery of the plate is fitted is a recess groove formed on the shoulder portion of the outer joint member.

3. A driving-wheel bearing device according to claim 2, wherein an outer diameter $D_1$ of an inlet portion of the recess groove is bigger than the inner diameter $d_1$ corresponding to the claw-like protrusions of the plate.

4. A driving-wheel bearing device according to claim 3, wherein an axial length L of a groove-bottom portion of the recess groove is bigger than a thickness t of the plate.

5. A driving-wheel bearing device according to claim 2, wherein an axial length L of a groove-bottom portion of the recess groove is bigger than a thickness t of the plate.

* * * * *